US008302560B2

(12) United States Patent
Tucker, Jr. et al.

(10) Patent No.: US 8,302,560 B2
(45) Date of Patent: Nov. 6, 2012

(54) SYSTEM AND METHOD FOR IMPLEMENTING AN ADAPTIVE MILKING PROCESS

(75) Inventors: George H. Tucker, Jr., Janesville, WI (US); David A. Reid, Hazel Green, WI (US); Gary C. Steingraber, Madison, WI (US); Timothy E. Blair, Belleville, WI (US)

(73) Assignee: Technologies Holdings Corp., Houston, TX (US)

( * ) Notice: Subject to any disclaimer, the term of this patent is extended or adjusted under 35 U.S.C. 154(b) by 342 days.

(21) Appl. No.: 12/796,870

(22) Filed: Jun. 9, 2010

(65) Prior Publication Data

US 2011/0303155 A1  Dec. 15, 2011

(51) Int. Cl.
*A01J 5/007* (2006.01)
*A01J 5/01* (2006.01)
(52) U.S. Cl. ............... 119/14.08; 119/14.02; 119/14.14
(58) Field of Classification Search ............. 119/14.02, 119/14.05, 14.08, 14.14, 14.15, 14.17, 14.18, 119/14.44, 14.55
See application file for complete search history.

(56) References Cited

U.S. PATENT DOCUMENTS

| 5,152,246 A | 10/1992 | Wakui et al. ............... 119/14.15 |
| 6,073,580 A * | 6/2000 | Graupner et al. ........... 119/14.08 |
| 2009/0007848 A1* | 1/2009 | Wartenhorst et al. ...... 119/14.02 |
| 2009/0199769 A1 | 8/2009 | Tucker et al. ............... 119/14.02 |

FOREIGN PATENT DOCUMENTS

| EP | 0 824 858 A1 | 2/1998 |
| EP | 1 279 326 A1 | 1/2003 |
| WO | WO 02/054857 A1 | 7/2002 |
| WO | WO 2008/051137 A1 | 5/2008 |

OTHER PUBLICATIONS

*PCT Notification of Transmittal of the International Search Report and the Written Opinion of the International Searching Authority* for International Application No. PCT/US2011/039372; 11 pages, Oct. 10, 2011.

* cited by examiner

*Primary Examiner* — Kimberly Berona
*Assistant Examiner* — Danielle Clerkley
(74) *Attorney, Agent, or Firm* — Baker Botts L.L.P.

(57) ABSTRACT

An adaptive milking system comprises a milk meter, a controller, and a detacher. The milk meter measures a flow rate of milking an animal during a first period of time, and continues to monitor the flow rate of milking the animal. The controller is communicatively coupled to the milk meter and calculates a percentage of the measured flow rate. The controller triggers a delay timer when the monitored flow rate of milking the animal becomes lower than the larger of (a) a default threshold flow rate and (b) the calculated percentage of the measured flow rate. The detacher is communicatively coupled to the controller and removes a milking unit from the animal when the delay timer reaches a threshold time.

47 Claims, 4 Drawing Sheets

| PEAK FLOW RATE (LB./MIN) | BASE DETACH THRESHOLD PERCENTAGE | CALCULATED DETACH THRESHOLD PERCENTAGE COEFFICIENT | DETACH THRESHOLD PERCENTAGE RESULT | BASE DETACH DELAY (SEC.) | CALCULATED DETACH DELAY COEFFICIENT | DETACH DELAY RESULT (SEC.) |
|---|---|---|---|---|---|---|
| 0 - 2 | 60% | | | 5 | | |
| 2.01 - 4 | 60% | 0.6 | 36% | 5 | 1.8 | 9.0 |
| 4.01 - 6 | 60% | 0.7 | 42% | 5 | 1.6 | 8.0 |
| 6.01 - 8 | 60% | 0.8 | 48% | 5 | 1.4 | 7.0 |
| 8.01 - 11 | 60% | 0.9 | 54% | 5 | 1.2 | 6.0 |
| 11.01 - 14 | 60% | 1.0 | 60% | 5 | 1.0 | 5.0 |
| 14.01 - 18 | 60% | 1.1 | 66% | 5 | 0.8 | 4.0 |
| OVER 18 | 60% | 1.2 | 72% | 5 | 0.6 | 3.0 |
| | | 1.3 | 78% | | 0.4 | 2.0 |

*FIG. 3*

SYSTEM AND METHOD FOR IMPLEMENTING AN ADAPTIVE MILKING PROCESS

TECHNICAL FIELD OF THE INVENTION

This invention relates generally to computerized systems for use in the dairy industry, and more particularly to a system for implementing an adaptive milking process.

BACKGROUND OF THE INVENTION

Automatic milking machines have traditionally relied on the fact that at the end of the milking process, the milk flow from a dairy animal (e.g., a cow, a goat, or any other milk-producing mammal) would slowly decrease from full flow to a low level that was designated as the detach flow rate. Normally, this decay time would take tens of seconds or even minutes to occur. This gave the detacher controls enough time to make a decision about when to remove the milking unit, and the user could make simple adjustments to have the cows milked out more completely (drier) or to leave more milk in the udder (wetter).

Recently, advances in milking equipment and procedures have changed this behavior. With proper equipment and cow preparation, cows can now be milked out in a much shorter time, and the milk flow may go from full flow to no flow in just a few seconds. If all of the milk is removed from the cow's udder and the unit remains on the teat for any length of time with no milk flow, the teat can be damaged. To prevent over-milking, users normally try to leave a small amount of milk in the udder. When the drop in milk flow was gradual, it was possible to use one standard detach threshold flow rate for most of the cows in the herd without over milking or under milking any of the cows significantly. With the new milking procedures, it is not possible to use a single threshold for all cows without over milking the high producing cows (who tend to drop off in flow rate faster at the end of the milking) or under milking the lower producers.

Pre-assigning individual thresholds to individual cows based on prior milking habits of each cow is not a practical solution because it requires a lot of manual effort to determine the correct thresholds and then enter and maintain the settings for all of the cows. It also requires that every cow be correctly identified during the milking process using electronic identification systems, and that each cow exhibits the same or similar milking characteristics each time the cow is milked.

SUMMARY OF THE INVENTION

In one embodiment, an adaptive milking system comprises a milk meter, a controller, and a detacher. The milk meter measures a flow rate of milking an animal during a first period of time, and continues to monitor the flow rate of milking the animal. The controller is communicatively coupled to the milk meter and calculates a percentage of the measured flow rate. The controller triggers a delay timer when the monitored flow rate of milking the animal becomes lower than the larger of (a) a default threshold flow rate and (b) the calculated percentage of the measured flow rate. The detacher is communicatively coupled to the controller and removes a milking unit from the animal when the delay timer reaches a threshold time.

In another embodiment, an adaptive milking method comprises measuring a flow rate of milking an animal during a first period of time, and calculating a percentage of the measured flow rate. The method continues by monitoring the flow rate of milking the animal, and triggering a delay timer when the monitored flow rate of milking the animal becomes lower than the larger of (a) a default threshold flow rate and (b) the calculated percentage of the measured flow rate. The method concludes by generating a control signal to stop the milking process when the delay timer reaches a threshold time.

In yet another embodiment, an adaptive milking system comprises a memory and a processor. The memory stores a default threshold flow rate. The processor is communicatively coupled to the memory and measures a flow rate of milking an animal during a first period of time, and calculates a percentage of the measured flow rate. The processor monitors the flow rate of milking the animal, and triggers a delay timer when the monitored flow rate of milking the animal becomes lower than the larger of (a) the default threshold flow rate and (b) the calculated percentage of the measured flow rate. The processor generates a control signal to stop the milking process when the delay timer reaches a threshold time.

Various embodiments of the invention may have none, some, or all of the following advantages. Technical advantages of this adaptive milking system is that the determination of when to stop the milking process for a given cow depends on the performance of that cow as it is being milked. It reduces or eliminates the need for user intervention or guesswork. It also does not require correct identification of a given cow and reliance on the prior milking characteristics of the cow. Instead, it determines an appropriate time to stop milking the cow based on the particular performance of the cow, including the peak flow rate of milk from the cow. This allows the adaptive milking system to customize the milking process for each cow. This results in a higher yield of milk production from both high producing cows and low producing cows. It also results in healthier cows due to the reduction of over milking cows, which can damage the teats of a cow, and the reduction of under milking the cows, which can cause the cows the reduce their production of milk over time. Other advantages will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which:

FIG. 3 illustrates one embodiment of a data table used by the adaptive milking system of FIG. 1.

DETAILED DESCRIPTION

Figure 1:
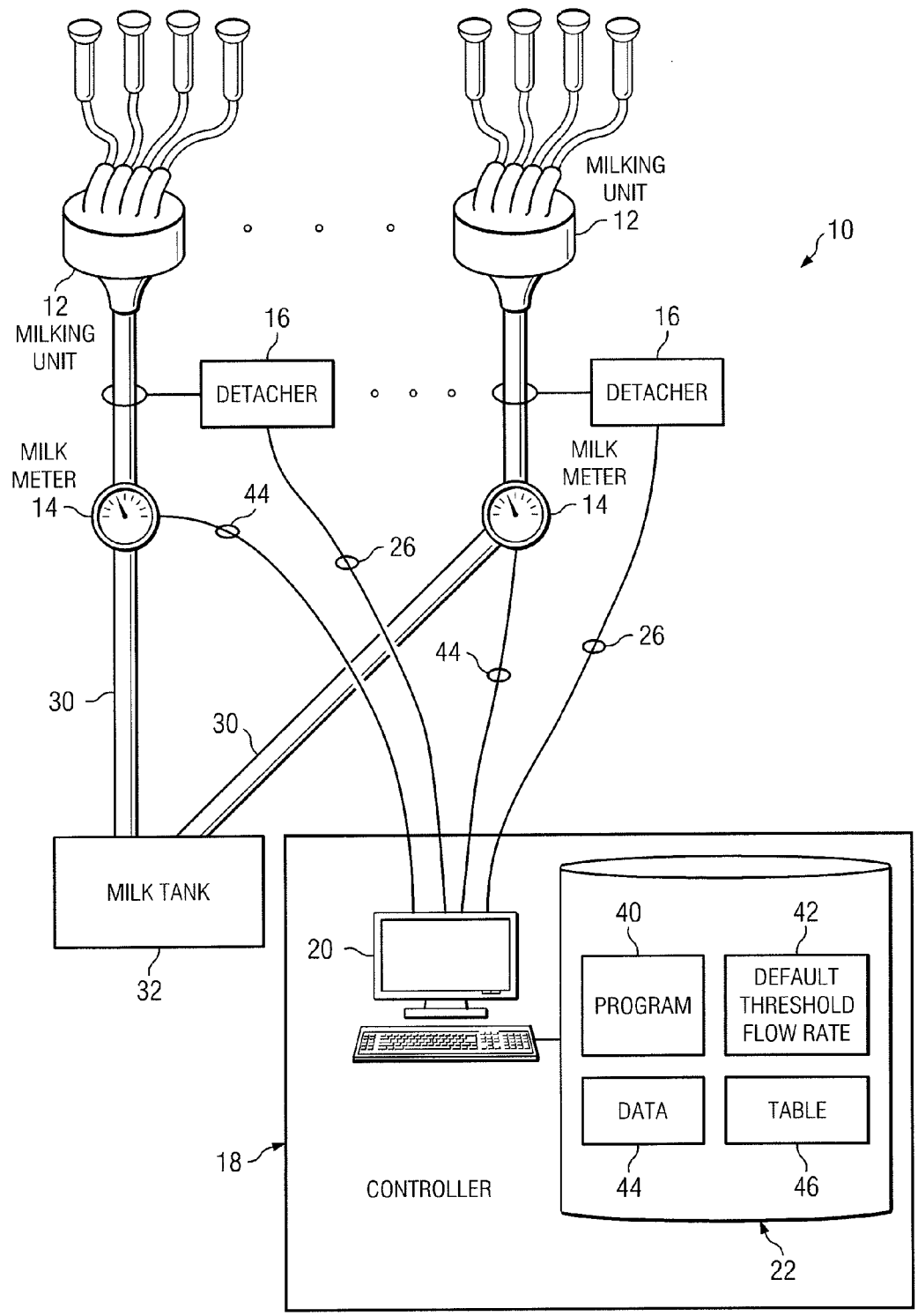
FIG. 1 illustrates a block diagram of an adaptive milking system according to one embodiment.

FIG. 1 illustrates an adaptive milking system 10 that includes milking units 12, milk meters 14, detacher units 16, and a controller 18. In general, milking system 10 is used to milk a cow, a goat, a sheep, or any other livestock suitable for milking. The remainder of this description will be detailed with respect to the milking of a cow. As milk is drawn from the cow using milking units 12, milk meters 14 measure certain information about the milking process, such as the flow rate of milk being produced, and communicates this information to controller 18. As will be described in greater detail below, controller 18 determines an appropriate time to terminate the milking process for a given cow based on the milking performance of that cow in any particular instance. Controller 18 communicates a control signal 26 to a detacher unit 16, as appropriate, and detacher unit 16 removes the milking unit 12 from the teats of the cow in response to this control signal 26. In this way, controller 18 is able to customize the milking experience for a given cow based on the performance of that cow during a particular milking cycle.

Milking unit 12 comprises an assembly attached to the cow's udder during milking. The milking unit 12 generally includes a claw, four shell assemblies, four milk tubes, four air tubes, and an air fork used to maintain an appropriate spacing between the other components of the milking unit 12. Milking unit 12 may also include a pulsator device used to alternately apply atmospheric air pressure or vacuum pressure to the teat cup liners which are attached to the teats of a cow in order to draw milk out of the cow. Although FIG. 1 illustrates two milking units 12, system 10 may include any number of milking units 12 to accommodate any particular size of milking parlor.

A milk meter 14 is associated with each corresponding milking unit 12, and comprises a measurement device that can weigh the milk as it passes through a milk line 30 to a milk tank 32. In general, milk meter 14 can measure and record a variety of information, referred to as measurement data 44, including, for example, an average flow rate (lbs/min), a current flow rate (lbs/min), teat flow rates (lbs/min), milking duration (sec), milk yield (lbs), milking unit attachment time (h:m:s), milk flow rate at stop (lbs/min), and any other suitable information used to manage an adaptive milking process according to system 10. Milk meter 14 may include any suitable combination of sensors and electromechanical components to perform the measurements described above.

Detacher unit 16 comprises an electromechanical device used to retract milking unit 12 from the teats of a cow. Detacher unit 16 may include a valve to turn off the milking vacuum to the milking unit 12 to facilitate the retraction of milking unit 12 from the teats of a cow. Detacher unit 16 may include a flexible retract member fastened at one end to the milking unit 12 and at the other end to a retract device for exerting a pulling force on the retract member to cause the milking unit 12 to be retracted from the teats of a cow. Detacher 16 may perform the retraction of an associated milking unit 12 in response to control signal 26 generated by controller 18, as described in greater detail below. Each detacher 16 operates independently of each other detacher 16, and controls the retraction of an associated milking unit 12 in response to a corresponding control signal 26.

Controller 18 comprises a processor 20 and a memory 22 used to control the adaptive milking process of system 10. Processor 20 may execute adaptive milking logic program 40 to perform the functions described herein. Memory 22 may store a default threshold flow rate 42 that may be used in one embodiment in the adaptive milking process described herein. Memory 22 further stores measurement data 44 associated with different cows and collected by milk meters 14 and communicated to controller 18. Memory 22 may further store a data table 46 used by processor 20 to perform the adaptive milking process described herein.

Figure 2:
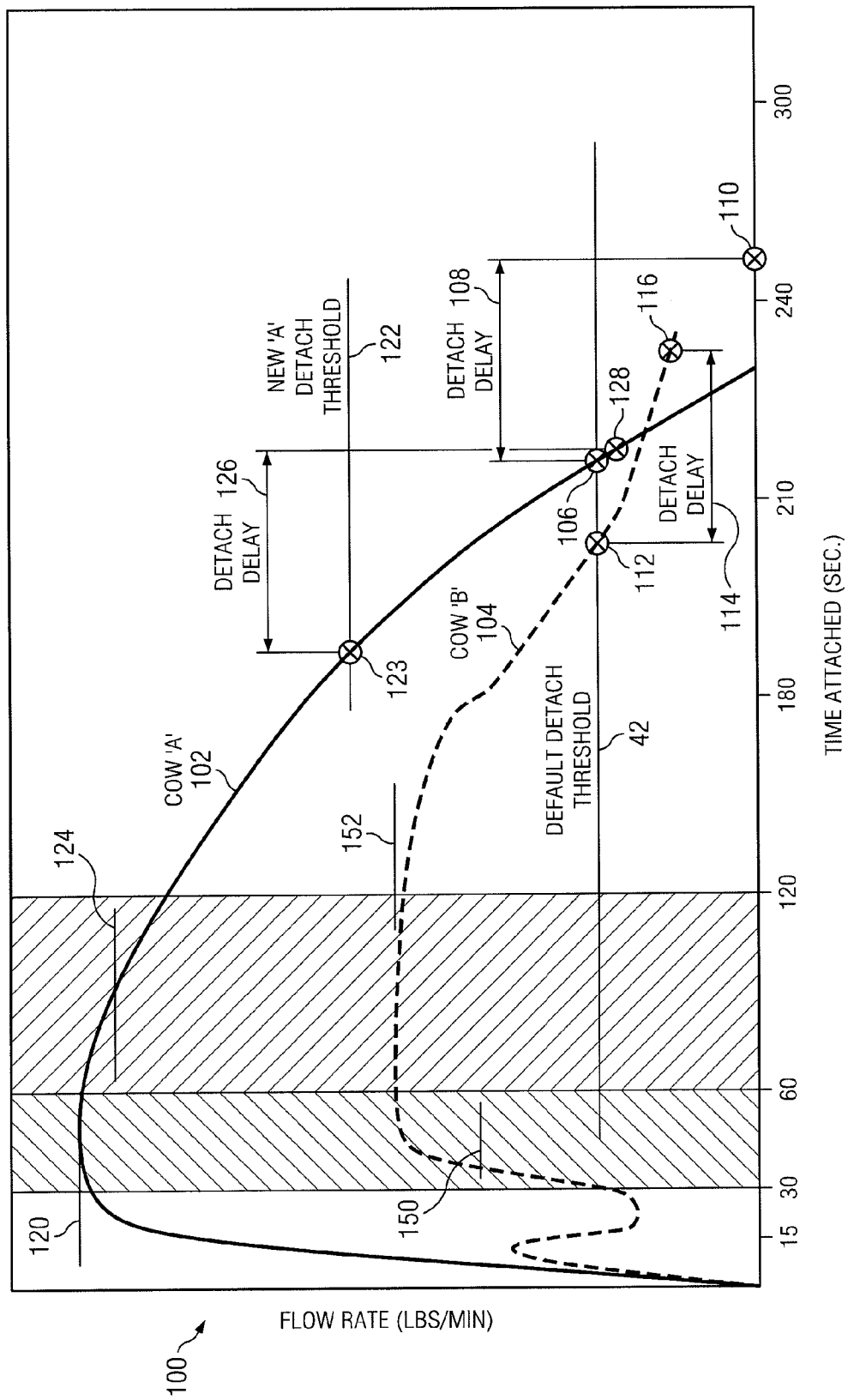
FIG. 2 illustrates one embodiment of a chart measuring the milk flow rate of two cows over time, using the adaptive milking system of FIG. 1.

The adaptive milking process of system 10 is described in greater detail with reference to FIG. 2. FIG. 2 illustrates one embodiment of a chart 100 measuring the milk flow rate of two cows over time. The vertical axis of chart 100 is the flow rate of milk production. Although chart 100 is detailed with reference to a measurement of pounds per minutes, any suitable measure of milk could be used, such as pounds, kilograms, ounces, liters, etc, over any suitable period of time, such as minutes, seconds, etc. The horizontal axis of chart 100 illustrates the time that a milking unit 12 is attached to a cow. Although chart 100 is detailed with reference to a measurement of seconds, any suitable measurement of time could be used, such as seconds, minutes, hours, etc. Chart 100 includes a graph 102 for a cow "A", and a graph 104 for a cow "B". Graph 102 for cow A shows a higher peak flow rate while graph 104 for cow B shows a lower flow rate and a slower drop in rate at the end of milking. In general, cow A is a fast-producing cow and cow B is a slow-producing cow.

One way of detaching a milking unit 12 from a cow is to measure the flow rate after a time delay, and when the flow rate falls below a default threshold flow rate 42 as shown at point 106 for cow A, a detach delay timer is started. If the measured flow rate for cow A stays below the default detach threshold 42 for the detach delay time 108, the milking unit 12 is removed from cow A at time 110. As shown, removal of the milking unit 12 at time 110 is well after the flow of milk has stopped for cow A. This causes an overmilking of cow A and can be detrimental to the health of cow A. Changing the default detach threshold 42 and the detach delay time 108 for cow A may not allow for the proper milking of cow B. The measured flow rate for cow B falls to the default detach threshold 42 at point 112, starting the detach delay 114, resulting in a detachment of milking unit 12 from cow B at point 116, which may already be sooner than desired even before changing the parameters of default detach threshold 42 to accommodate cow A.

One embodiment of the adaptive milking process of system 10 is to keep a minimum default detach threshold 42 to provide a setting suitable for a slow-milking cow, but to monitor the milk flow rate of a particular cow during different periods of time and adapting the detach threshold based on the milking performance of the particular cow. For example, the flow rate of milking for cow A may be monitored between thirty and sixty seconds after the milking process begins, resulting in a flow rate 120. A percentage of flow rate 120 is calculated, as described in greater detail below, and if it is larger than the default detach threshold 42, it becomes the new detach threshold 122 for cow A. Furthermore, the flow rate of milking for cow A is measured between sixty and one hundred-twenty seconds resulting in a flow rate 124 for cow A. A percentage of flow rate 124 is calculated, and if it is larger than the default detach threshold 42 and the new detach threshold 122, then it becomes the new detach threshold 122 for cow A.

As graph 102 illustrates, the milk flow rate of a cow peaks somewhere between a first period of time between thirty and sixty seconds after milking begins, or a second period of time between sixty and one hundred-twenty seconds after milking begins, and then drops off either gradually at first or steeply later in the milking cycle. As the flow rate for cow A drops below the new threshold 122 at point 123, a detach delay timer 126 is triggered, resulting in the milking unit 12 being removed from cow A at time 128. The advantage of the adaptive milking process of system 10 is that the milking unit 12 is detached from cow A at time 128 as opposed to time 110. The earlier detach time is preferred to avoid overmilking cow A.

Cow B may also be monitored for flow rate between thirty and sixty seconds resulting in flow rate 150. A percentage of flow rate 150 is calculated, and if it is larger than the default detach threshold 42, then it is used as the new detach threshold, which is not the case in the example illustrated in chart 100 for cow B. Furthermore, the flow rate of milking for cow B is measured between sixty and one hundred-twenty seconds after milking begins, resulting in a flow rate 152 for cow B. A percentage of flow rate 152 is calculated, and if it is larger than the default detach threshold 42 and the new threshold measured between thirty to sixty seconds after milking begins, it becomes the new detach threshold, which in this example is approximately the same as the default detach threshold 42. Therefore, in this example, cow B is detached at the same time 116 as described above using default detach threshold 42. The ability of system 10 to adapt the detach threshold for faster milking cows automatically allows the detach threshold and/or the detach delay to be lowered for a slower milking cow, possibly resulting in a later, more appropriate detach for such a cow.

In another embodiment of the adaptive milking process implemented by system 10, the default detach threshold 42 is set to zero. The flow rate of milking for cow B is measured between thirty and sixty seconds after milking begins resulting in flow rate 150. A percentage of flow rate 150 is calculated and is used as the detach threshold. Furthermore, the flow rate of milking for cow B is measured between sixty and one hundred-twenty seconds resulting in a flow rate 152 for cow B. The percentage of flow rate 152 is calculated and if it is larger than the thirty to sixty second threshold, it becomes the new detach threshold. Thus, all cows use a detach threshold based on their peak flow rate measured between thirty and one hundred-twenty seconds.

The discussion above assumes a user settable detach threshold percentage and a user settable detach delay that are shared by all cows. However, the adaptive milking process system 10 may further be implemented to utilize detach threshold percentage and detach delay times based on the peak flow rate of a particular cow. These percentages and delay times could have user settable coefficients, allowing increasing or decreasing proportionality, as described below with respect to FIG. 3.

FIG. 3 illustrates one embodiment of a data table 46 used by the adaptive milking system 10. Data table 46 includes columns 202a-g and rows 204a-h. Column 202a includes data related to the peak flow rate of milking for a cow (e.g., measured in pounds per minute). Column 202b provides a base detach threshold percentage, which is provided as 60% in data table 46. Column 202c provides a calculated detach threshold percentage coefficient ranging from 0.6 to 1.3 in rows 204a-h of data table 46. Column 202d provides a detach threshold percentage result ranging from 36% to 78% in rows 204a to 204h of data table 46. Column 202e provides a base detach delay measured in seconds, which is listed as 5 seconds for each of rows 204a through 204h of data table 46. Column 202f provides a calculated detach delay coefficient ranging from 1.8 to 0.4 in rows 204a through 204h of data table 46. Finally, column 202g provides a detach delay result measured in seconds ranging from 9.0 seconds to 2.0 seconds from row 204a through row 204h of data table 46. As can be seen from the example data provided in data table 46, the calculated detach threshold percentage provided in column 202d is proportional to the peak flow rate of milking a cow as provided in column 202a. Moreover, the detach delay measured in seconds provided in column 202g is inversely proportional to the peak flow rate provided in column 202a.

In this example data table 46, a cow with a peak flow rate of 5 pounds per minute would automatically be assigned a detach threshold percentage of 48% and a detach delay of 7 seconds, while a cow with a peak flow rate of 12 pounds per minute would automatically be assigned a detach threshold percentage of 66% and a detach delay of 4 seconds. For a given cow, controller 18 looks up the measured peak flow rate in data table 46 and uses the corresponding threshold percentage and/or detach delay time for the detach process. Both coefficients in columns 202c and 202f could have a sensitivity parameter and a positive or negative correlation entered by the user into formulas to create the values in the data table 46. The data in data table 46 is merely an example and could be modified according to additional constraints and parameters.

Figure 4:
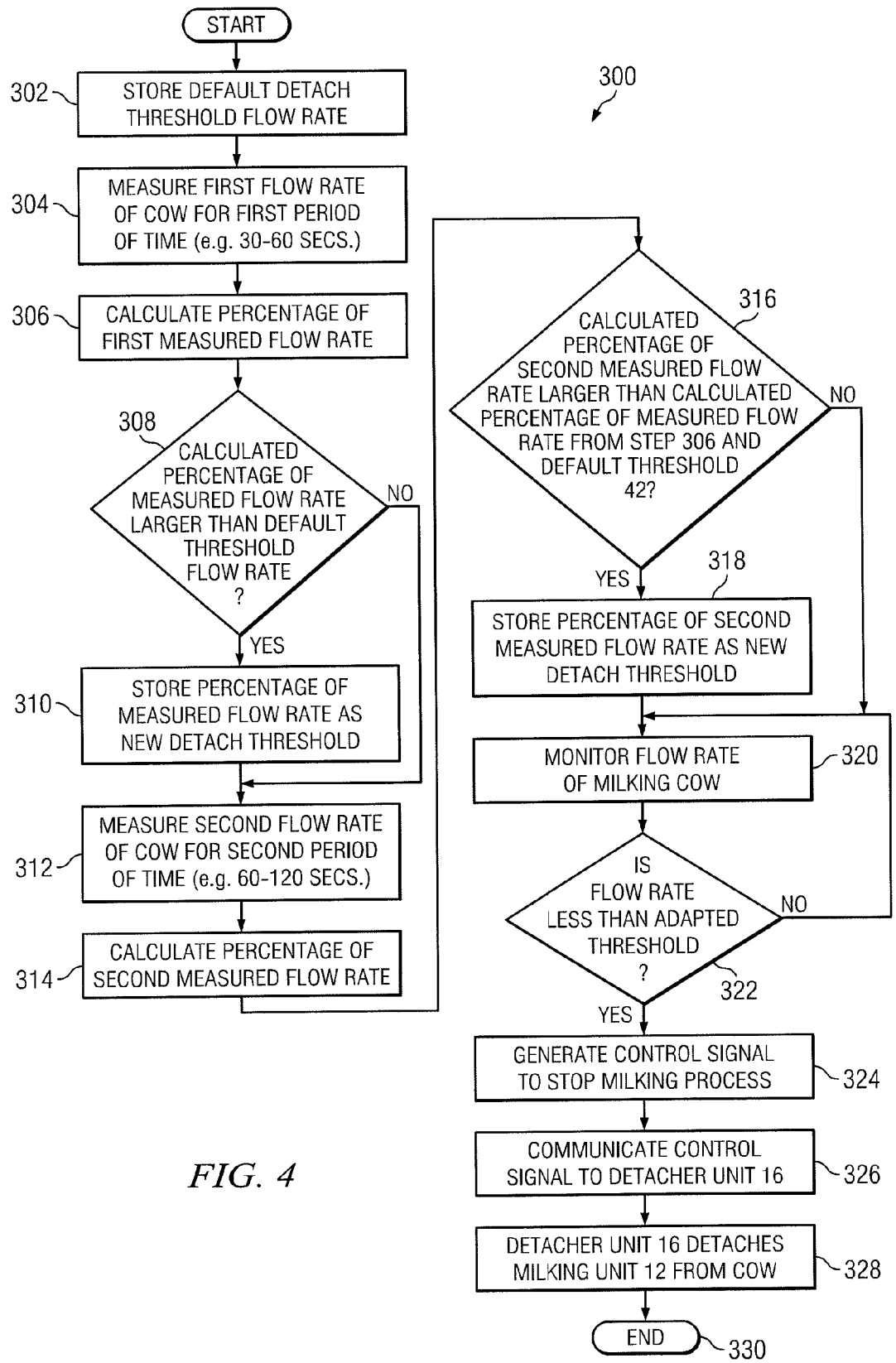
FIG. 4 illustrates one embodiment of a flow chart of an adaptive milking process.

FIG. 4 illustrates one embodiment of a flowchart 300 of an adaptive milking process implemented by system 10. Memory 22 of controller 18 stores a default detach threshold flow rate 42 for a particular cow at step 302. Milk meter 14 measures a first milk flow rate for the cow for a first period of time, such as from thirty to sixty seconds after the milking process begins, at step 304. This information may be communicated as measurement data 44 to controller 18. At step 306, processor 20 of controller 18 calculates a percentage of the first flow rate measured at step 304. Processor 20 may use data from data table 46 to determine the appropriate percentage, as described above with reference to FIG. 3.

Execution proceeds to step 308 where processor 20 determines whether the percentage of the first measured flow rate calculated at step 306 is larger than the default detach threshold flow rate 42. If so, memory 22 stores the percentage of the first measured flow rate calculated at step 306 as a new detach threshold for the cow, at step 310. If not, or after execution of step 310, execution proceeds to step 312, where milk meter 14 measures a second flow rate of the cow for a second period of time such as between sixty and one hundred-twenty seconds after the milking process begins. Again, this information may be communicated from milk meter 14 to controller 18 as measurement data 44. At step 314, processor 20 calculates a percentage of the second flow rate measured at step 312.

Execution proceeds to step 316 where processor 20 determines whether the percentage of second measured flow rate calculated at step 314 is larger than the percentage of measured flow rate calculated at step 306 and the default detach threshold 42. If so, execution proceeds to step 318 where memory 22 stores the percentage of second measured flow rate calculated at step 314 as the new detach threshold for the cow. If not, or after the execution of step 318, execution proceeds to step 320 where milk meter 14 continues to monitor the flow rate of milking for the cow. This measured flow rate is communicated to controller 18 as measurement data 44 on a periodic or continuous basis.

Execution proceeds to step 322 where processor 20 determines if the flow rate of milking for the cow as monitored at step 320 becomes less than the default threshold 42 and/or the new detach threshold for the cow as determined at steps 310 and/or 318. If not, execution returns to step 320, where milk meter 14 continues to monitor the flow rate of the milking for the cow. If so, execution proceeds to step 324 where processor 20 of controller 18 generates a control signal 26 used to stop the milking process for the cow. At step 326, processor 20 of controller 18 communicates the control signal 26 to detacher unit 16. Execution proceeds to step 328, where detacher unit 16 detaches the milking unit 12 from the cow. Execution terminates at step 330.

Although the example embodiments have been described in detail, it should be understood that various changes, substitutions, and alterations can be made hereto without departing from the scope of the disclosure as defined by the appended claims.

What is claimed is:

1. An adaptive milking system, comprising:
a memory operable to store a default threshold flow rate; and
a processor operable to:
measure a flow rate of milking an animal during a first period of time;
calculate a percentage of the measured flow rate;
monitor the flow rate of milking the animal;
trigger a delay timer when the monitored flow rate of milking the animal becomes lower than the larger of (a) the default threshold flow rate and (b) the calculated percentage of the measured flow rate; and
generate a control signal to stop the milking process when the delay timer reaches a threshold time.

2. The system of claim 1, wherein the default threshold flow rate comprises a measure of milk that is milked from the animal over a period of time.

3. The system of claim 1, wherein the first period of time is from approximately sixty seconds to approximately one-hundred-twenty seconds after the animal begins to be milked.

4. The system of claim 1, wherein the percentage is determined based at least in part upon a peak flow rate of milking the animal.

5. The system of claim 4, wherein the peak flow rate of milking the animal is determined by averaging the measured flow rate of milking the animal from approximately sixty seconds to approximately one-hundred-twenty seconds after the animal begins to be milked.

6. The system of claim 4, wherein the percentage is proportional to the peak flow rate of milking the animal.

7. The system of claim 1, wherein the threshold time is determined based at least in part upon a peak flow rate of milking the animal.

8. The system of claim 7, wherein the peak flow rate of milking the animal is determined by averaging the measured flow rate of milking the animal from approximately sixty seconds to approximately one-hundred-twenty seconds after the animal begins to be milked.

9. The system of claim 7, wherein the threshold time is inversely proportional to the peak flow rate of milking the animal.

10. The system of claim 1, wherein:
the measured flow rate comprises a first measured flow rate;
the processor is further operable to:
measure a second flow rate of milking the animal during a second period of time; and
calculate a percentage of the second measured flow rate; and
the delay timer is triggered when the monitored flow rate of milking the first animal becomes lower than the larger of (a) the default threshold flow rate, (b) the calculated percentage of the first measured flow rate, and (c) the calculated percentage of the second measured flow rate.

11. The system of claim 10, wherein:
the first period of time is from approximately thirty seconds to approximately sixty seconds after the animal begins to be milked; and
the second period of time is from approximately sixty seconds to approximately one-hundred-twenty seconds after the animal begins to be milked.

12. The system of claim 1, wherein the animal comprises a first animal and the processor is further operable to:
measure a flow rate of milking a second animal during a third period of time;
calculate a percentage of the measured flow rate for the second animal;
monitor the flow rate of milking the second animal;
trigger a second delay timer when the monitored flow rate of milking the second animal becomes lower than the larger of (a) the default threshold flow rate and (b) the calculated percentage of the measured flow rate for the second animal; and
generate a control signal to stop the milking process for the second animal when the second delay timer reaches a predetermined time.

13. The system of claim 12, wherein:
the measured flow rate comprises a first measured flow rate for the second animal;
the processor is further operable to:
measure a second flow rate of milking the second animal during a fourth period of time; and
calculate a percentage of the second measured flow rate for the second animal;
and
the second delay timer is triggered when the monitored flow rate of milking the second animal becomes lower than the larger of (a) the default threshold flow rate, (b) the calculated percentage of the first measured flow rate for the second animal, and (c) the calculated percentage of the second measured flow rate for the second animal.

14. The system of claim 13, wherein:
the third period of time is from approximately thirty seconds to approximately sixty seconds after the second animal begins to be milked; and
the fourth period of time is from approximately sixty seconds to approximately one-hundred-twenty seconds after the second animal begins to be milked.

15. The system of claim 1, further comprising a detacher operable to remove a milking unit from the animal in response to the control signal.

16. The system of claim 1, wherein the default threshold flow rate is zero.

17. An adaptive milking method, comprising:
measuring a flow rate of milking an animal during a first period of time;
calculating a percentage of the measured flow rate;
monitoring the flow rate of milking the animal;
triggering a delay timer when the monitored flow rate of milking the animal becomes lower than the larger of (a) a default threshold flow rate and (b) the calculated percentage of the measured flow rate; and
generating a control signal to stop the milking process when the delay timer reaches a threshold time.

18. The method of claim 17, wherein the default threshold flow rate comprises a measure of milk that is milked from the animal over a period of time.

19. The method of claim 17, wherein the first period of time is from approximately sixty seconds to approximately one-hundred-twenty seconds after the animal begins to be milked.

20. The method of claim 17, wherein the percentage is determined based at least in part upon a peak flow rate of milking the animal.

21. The system of claim 20, wherein the peak flow rate of milking the animal is determined by averaging the measured flow rate of milking the animal from approximately sixty seconds to approximately one-hundred-twenty seconds after the animal begins to be milked.

22. The method of claim 20, wherein the percentage is proportional to the peak flow rate of milking the animal.

23. The method of claim 17, wherein the threshold time is determined based at least in part upon a peak flow rate of milking the animal.

24. The method of claim 23, wherein the peak flow rate of milking the animal is determined by averaging the measured flow rate of milking the animal from approximately sixty seconds to approximately one-hundred-twenty seconds after the animal begins to be milked.

25. The method of claim 23, wherein the threshold time is inversely proportional to the peak flow rate of milking the animal.

26. The system of claim 17, wherein:
the measured flow rate comprises a first measured flow rate;
the method further comprising:
measuring a second flow rate of milking the animal during a second period of time; and
calculating a percentage of the second measured flow rate;
and
the delay timer is triggered when the monitored flow rate of milking the first animal becomes lower than the larger of (a) the default threshold flow rate, (b) the calculated percentage of the first measured flow rate, and (c) the calculated percentage of the second measured flow rate.

27. The method of claim 26, wherein:
the first period of time is from approximately thirty seconds to approximately sixty seconds after the animal begins to be milked; and
the second period of time is from approximately sixty seconds to approximately one-hundred-twenty seconds after the animal begins to be milked.

28. The method of claim 17, wherein the animal comprises a first animal and the method further comprising:
measuring a flow rate of milking a second animal during a third period of time;
calculating a percentage of the measured flow rate for the second animal;
monitoring the flow rate of milking the second animal;
triggering a second delay timer when the monitored flow rate of milking the second animal becomes lower than the larger of (a) the default threshold flow rate and (b) the calculated percentage of the measured flow rate for the second animal; and
generating a control signal to stop the milking process for the second animal when the second delay timer reaches a predetermined time.

29. The method of claim 28, wherein:
the measured flow rate comprises a first measured flow rate for the second animal;
the method further comprising:
measuring a second flow rate of milking the second animal during a fourth period of time; and
calculating a percentage of the second measured flow rate for the second animal;
and
the second delay timer is triggered when the monitored flow rate of milking the second animal becomes lower than the larger of (a) the default threshold flow rate, (b) the calculated percentage of the first measured flow rate for the second animal, and (c) the calculated percentage of the second measured flow rate for the second animal.

30. The method of claim 29, wherein:
the third period of time is from approximately thirty seconds to approximately sixty seconds after the second animal begins to be milked; and
the fourth period of time is from approximately sixty seconds to approximately one-hundred-twenty seconds after the second animal begins to be milked.

31. The method of claim 17, further comprising detaching a milking unit from the animal in response to the control signal.

32. The method of claim 17, wherein the default threshold flow rate is zero.

33. An adaptive milking system, comprising:
a milk meter operable to:
measure a flow rate of milking an animal during a first period of time; and
monitor the flow rate of milking the animal;
a controller communicatively coupled to the milk meter and operable to:
calculate a percentage of the measured flow rate;
trigger a delay timer when the monitored flow rate of milking the animal becomes lower than the larger of (a) a default threshold flow rate and (b) the calculated percentage of the measured flow rate; and
a detacher communicatively coupled to the controller and operable to remove a milking unit from the animal when the delay timer reaches a threshold time.

34. The system of claim 33, wherein the default threshold flow rate comprises a measure of milk that is milked from the animal over a period of time.

35. The system of claim 33, wherein the first period of time is from approximately sixty seconds to approximately one-hundred-twenty seconds after the animal begins to be milked.

36. The system of claim 33, wherein the percentage is determined based at least in part upon a peak flow rate of milking the animal.

37. The system of claim 36, wherein the peak flow rate of milking the animal is determined by averaging the measured flow rate of milking the animal from approximately sixty seconds to approximately one-hundred-twenty seconds after the animal begins to be milked.

38. The system of claim 36, wherein the percentage is proportional to the peak flow rate of milking the animal.

39. The system of claim 33, wherein the threshold time is determined based at least in part upon a peak flow rate of milking the animal.

40. The system of claim 39, wherein the peak flow rate of milking the animal is determined by averaging the measured flow rate of milking the animal from approximately sixty seconds to approximately one-hundred-twenty seconds after the animal begins to be milked.

41. The system of claim 39, wherein the threshold time is inversely proportional to the peak flow rate of milking the animal.

42. The system of claim 33, wherein:
the measured flow rate comprises a first measured flow rate;
the milk meter is further operable to measure a second flow rate of milking the animal during a second period of time;
the controller is further operable to calculate a percentage of the second measured flow rate; and
the delay timer is triggered when the monitored flow rate of milking the first animal becomes lower than the larger of (a) the default threshold flow rate, (b) the calculated percentage of the first measured flow rate, and (c) the calculated percentage of the second measured flow rate.

43. The system of claim 42, wherein:
the first period of time is from approximately thirty seconds to approximately sixty seconds after the animal begins to be milked; and the second period of time is from approximately sixty seconds to approximately one-hundred-twenty seconds after the animal begins to be milked.

44. The system of claim 33, wherein:
the animal comprises a first animal;
a second milk meter is operable to:
   measure a flow rate of milking a second animal during a third period of time; and
   monitor the flow rate of milking the second animal;
the controller is further operable to:
   calculate a percentage of the measured flow rate for the second animal; and
   trigger a second delay timer when the monitored flow rate of milking the second animal becomes lower than the larger of (a) the default threshold flow rate and (b) the calculated percentage of the measured flow rate for the second animal; and
a second detacher is operable to remove a second milking unit from the second animal when the second delay timer reaches a predetermined time.

45. The system of claim 44, wherein:
the measured flow rate comprises a first measured flow rate for the second animal;
the second milk meter is further operable to measure a second flow rate of milking the second animal during a fourth period of time;
the controller is further operable to calculate a percentage of the second measured flow rate for the second animal; and
the second delay timer is triggered when the monitored flow rate of milking the second animal becomes lower than the larger of (a) the default threshold flow rate, (b) the calculated percentage of the first measured flow rate for the second animal, and (c) the calculated percentage of the second measured flow rate for the second animal.

46. The system of claim 45, wherein:
the third period of time is from approximately thirty seconds to approximately sixty seconds after the second animal begins to be milked; and
the fourth period of time is from approximately sixty seconds to approximately one-hundred-twenty seconds after the second animal begins to be milked.

47. The system of claim 33, wherein the default threshold flow rate is zero.

* * * * *